MAGNETIC TAPE RECORDING AND REPRODUCING SYSTEM

Filed May 6, 1955 3 Sheets-Sheet 1

CHARLES P. GINSBURG &
SHELBY F. HENDERSON JR.
INVENTORS

BY
Flehr & Swain
ATTORNEYS

MAGNETIC TAPE RECORDING AND REPRODUCING SYSTEM

Filed May 6, 1955

3 Sheets-Sheet 2

CHARLES P. GINSBURG &
SHELBY F. HENDERSON JR.
INVENTORS

BY

ATTORNEYS

MAGNETIC TAPE RECORDING AND REPRODUCING SYSTEM

Filed May 6, 1955

3 Sheets-Sheet 3

CHARLES P. GINSBURG &
SHELBY F. HENDERSON JR.
INVENTORS

BY Fletcher Ezell & Swain

ATTORNEYS

United States Patent Office 2,866,012

Patented Dec. 23, 1958

2,866,012

MAGNETIC TAPE RECORDING AND REPRODUCING SYSTEM

Charles P. Ginsburg, Los Altos, and Shelby F. Henderson, Jr., Woodside, Calif., assignors to Ampex Corporation, Redwood City, Calif., a corporation of California Application May 6, 1955, Serial No. 506,552

4 Claims. (Cl. 179—100.2)

This invention relates generally to electro-magnetic tape systems and apparatus, and particularly to systems and apparatus of this character capable of recording and reproducing signal intelligence over a wide frequency range, including, for example, video frequencies.

Conventional magnetic tape apparatus employs a stationary magnetic head assembly, together with tape transport means for carrying and feeding the tape at a constant speed across the magnetic head. Assuming reasonable tape speeds, such equipment is definitely limited with respect to its usable frequency range. Therefore it is not usable for the recording of frequencies of the order of two megacycles or higher, such as employed in present day video systems. Although the frequency range can be increased by increasing the speed of feed of the tape, the speeds required for the recording of video frequencies are such that the system becomes impracticable because of the large amount of tape employed in a given period.

It has been proposed to increase the upper frequency limit by means of a rotary magnetic head assembly provided with magnetic units arranged to sweep successively over arcuate paths across a relatively wide tape. Such a system and apparatus is disclosed in Ginsburg et al. application Ser. No. 47,138, filed May 3, 1954, and entitled "Visual Image Recording and Reproducing System and Method." While the apparatus as disclosed in said application is workable it is subject to certain inherent disadvantages. Particularly, the magnetic units sweep through arcuate paths across the tape, and this tends to introduce distortions due to the changing angularity between each unit and the tape.

In general it is an object of the present invention to provide an improved magnetic tape apparatus of the rotary head type.

A further object of the invention is to provide a magnetic tape apparatus of the above character in which the magnetic units sweep rectilinearly across the tape, rather than along arcuate areas.

Another object of the invention is to provide an improved complete video recording and reproducing system making use of a rotary magnetic head assembly.

Additional objects of the invention will appear from the following description in which the preferred embodiment has been set forth in detail in conjunction with the accompanying drawing.

Referring to the drawing.

Figures 1, 2, 3:
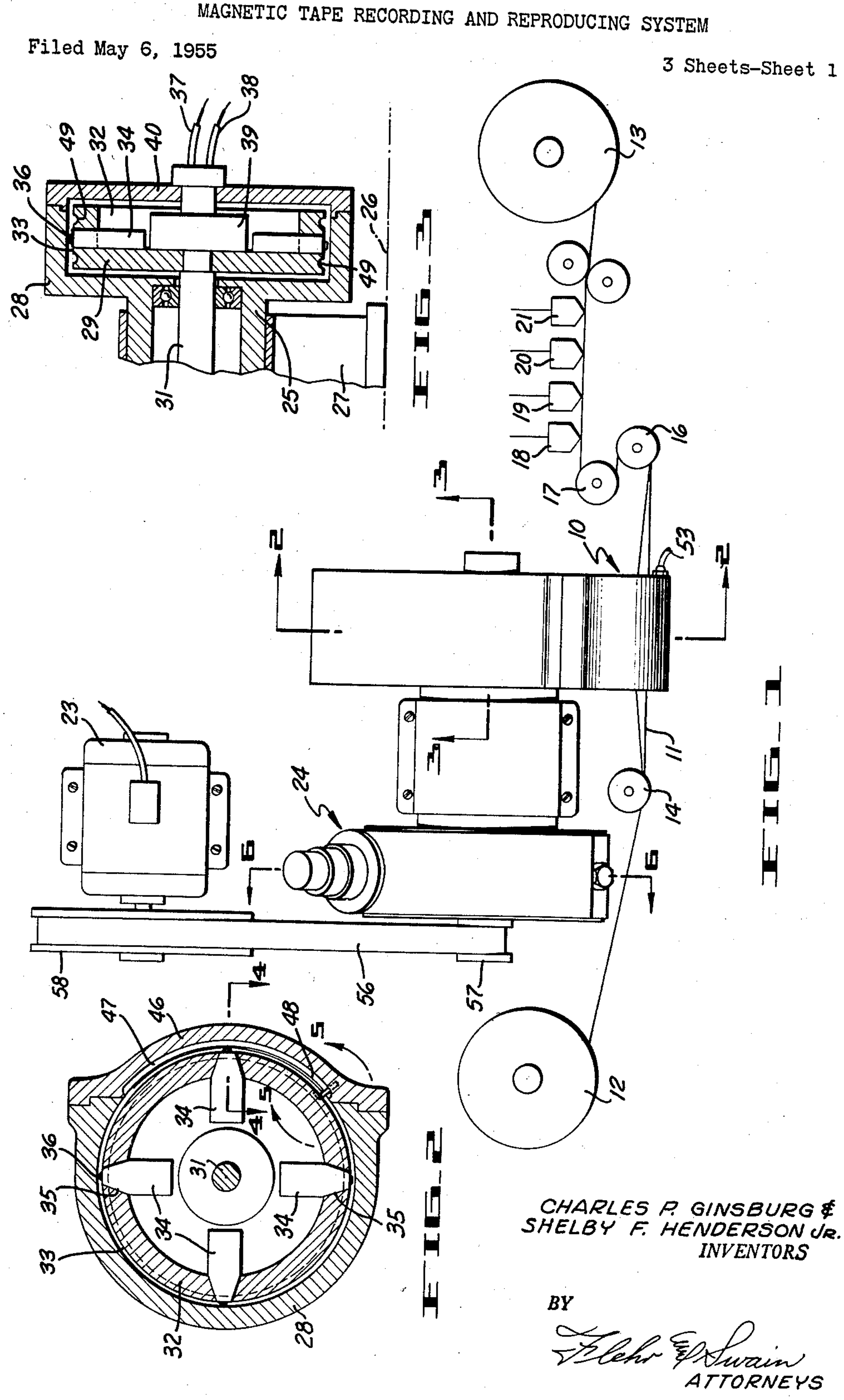
Figure 1 is a schematic plan view illustrating magnetic tape apparatus incorporating the present invention.
Figure 2 is a cross-sectional view taken along the line 2—2 of Figure 1.
Figure 3 is a cross-sectional view taken along the line 3—3 of Figure 1.

The apparatus illustrated in Figure 1 consists of a magnetic head assembly 10, which cooperates with the magnetic tape 11. The transport means illustrated for carrying and feeding the tape includes conventional supply and takeup reels 12 and 13 which can be carried by suitable turntables. Guide studs or rollers 14 and 16, which are preferably flanged, are disposed to engage the tape at spaced distances from the operating end of the head assembly. The tape also engages a driving capstan 17, and for the type of system to be presently described, it is also brought into contact with the magnetic heads 18, 19, 20 and 21. The tape employed is of substantial width compared to tape used with conventional magnetic tape equipment. For example, it may have a width of the order of 2″, and like magnetic tape now available on the market for sound recording equipment, it can consist of a pliable film of plastic material having a thin coating of magnetic material on one side of the same.

The magnetic head assembly is driven by an electric motor 23, preferably through a belt drive as will be presently described. Pulse generating means 24 is also associated with the head and serves to generate pulses having a frequency dependent upon the speed of rotation of the head, and is used in conjunction with the speed control system.

To describe the rotary head assembly in greater detail, it consists of a stationary housing or shell 25 that is carried upon a mounting panel 26 by suitable means such as the base 27. The enlarged annular portion 28 of the shell encloses a rotatable member 29 that is carried by the shaft 31 (Figure 3).

Member 29 is provided with an annular rim 32 and is formed to provide a cylindrical peripheral surface 33 of substantial width. Member 29 serves to mount a plurality of magnetic transducer units 34. These units can be made according to known techniques and can consist, for example of U-shaped magnetic core pieces having windings and pole tips spaced by a thin non-magnetic gap, as for example a gap of the order of 0.0005 inch. The pole tips of each magnetic unit form the tip end 36 that extends slightly beyond the peripheral surface 33. The width of each tip as measured in a direction longitudinally of the shaft 31 should be relatively small, as for example 0.010 inch. Each magnetic transducer made as just described can be embedded in a body of plastic material to form the complete unit 34. The rim 32 is shown with a plurality of tapered slots 35 within which the units are accommodated in the manner illustrated in Figure 2. Suitable means can be used to hold the units in place.

Figure 5:
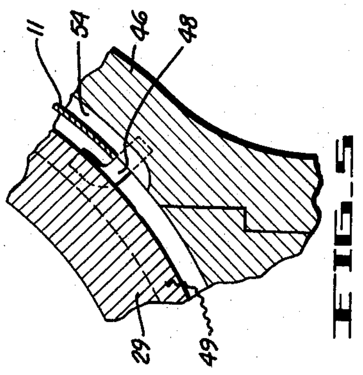
Figure 5 is an enlarged cross-sectional detail of the region 5—5 of Figure 2.
Figure 8:
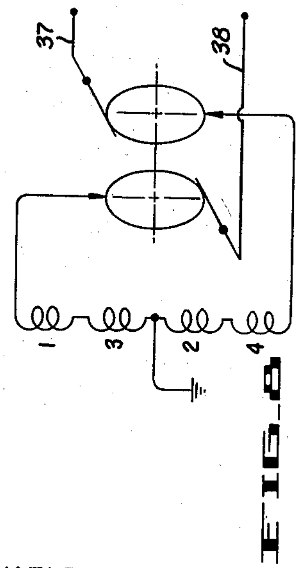
Figure 8 is a schematic diagram illustrating electrical connections to the several magnetic units of the rotary head.

In Figure 8 the magnetic units are represented as coils numbered 1, 2, 3 and 4. Coils 1 and 3 and also 2 and 4 are serially connected as illustrated. Terminals of coils 3 and 2 are connected together and also to ground. The end terminals of coils 1 and 4 are connected to means serving to couple the coils to the output terminals 37 and 38. This means can be slip rings as illustrated in Figure 8, and which can be contained within the assembly 39 as shown in Figure 3. In place of such slip rings it is possible to use capacitative couplings by way of condenser plates carried respectively by the rotating member 29 and the stationary shell. Enlarged shell portion 28 can be conveniently provided with a cover 40 through which terminal leads 37 and 38 extend. A special means is provided in conjunction with the head for bending that portion of the tape adjacent the head to arcuate form, whereby it conforms to the circular path through which the pole tips 36 pass. Thus a stationary guide member 46 is provided which has an inner arcuate surface 47 (Figure 2). This surface conforms to the arc of a circle, the circle having a center coincident with the axis of shaft 31. The magnetic tape 11 is fed between the surface 47 and the peripheral surface 33 of the head. At one end of the surface 47, members 48 (Figure 5) are provided which may be hook-shaped as illustrated, and which form shoulders for engaging the adjacent edge of the tape. The direction of rotation of the head is such that friction between the head and the tape tends to urge the tape against the members 48. As illustrated in Figure 5 (in conjunction with Figure 2) the periphery 33 of the head can be provided with grooves 49 to accommodate members 48.

In operation physical contact is maintained between one side of the tape and the curved surface 47. To insure such contact the arcuate surface 47 can be interrupted by the grooves 51, which terminate short of the ends of the surface 47, and are connected to suitable evacuating means. Thus in Figure 4 both grooves 51 are shown connected to the duct 52 and from thence to the tube 53. This tube can lead to a suitable evacuating chamber, which in turn is connected to an evacuating pump.

Maintenance of a partial vacuum or sub-atmospheric pressure in grooves 51 serves to apply pneumatic pressure to the tape in a direction to urge the tape into intimate contact with surface 47. While the suction retaining means just described is deemed desirable, it is not essential and may be omitted.

Figure 4:
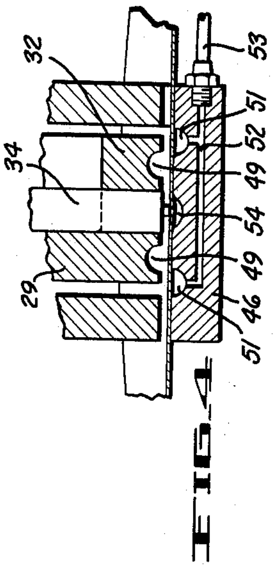
Figure 4 is an enlarged cross-sectional detail illustrating details of the guide means and taken along the line 4—4 of Figure 2.

Previous reference has been made to the fact that the pole tips 36 preferably extend a slight distance from the peripheral surface 33. As shown in Figure 4 the guide member 46 is provided with a circumferential groove 54, whereby the tape is not supported in the region of contact with the pole tips. This permits a slight amount of deflection of the tape at the region of contact to insure uniform pressure contact between the pole tips and the magnetic coating. In effect the groove 54 defines two axially spaced arcuate surfaces along the surface 47, with each of the two surfaces being interrupted by a groove 51.

In the construction illustrated, a portion of the enlarged portion 28 of the shell has been cut away to accommodate the guide member 46. Also the guide member is shown mounted by attaching it directly to the shell.

It is possible for the motor 23 to be directly connected to the shaft 31. However, it is desirable to reduce the speed requirements of the motor by providing a suitable drive connection. Thus a drive belt 56 (Figure 1) is shown engaging a pulley 57 on the shaft 31, and a pulley 58 on the shaft of the motor 23. The belt can be one of the type made of nylon fabric.

Figure 6:
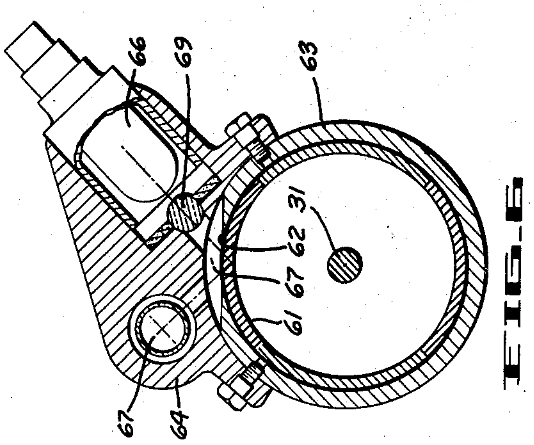
Figure 6 is a cross-sectional view taken along the line 6—6 of Figure 1.
Figure 7:
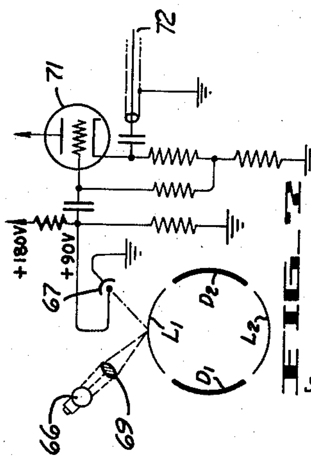
Figure 7 is a schematic view illustrating the photoelectric pulse generating means associated with the rotary head.

The pulse generating means 24 can be of the photoelectric type as shown in Figures 6 and 7. Thus a wheel or drum 61 is carried by that end of the shaft 31 remote from the operating end of the head and provides a peripheral light reflecting surface 62. An enlarged shell portion 63 encloses the drum 61, and serves to carry the mounting block 64. Within the block 64 there is a lamp 66 and a photoelectric tube 67. The shell is cut away as indicated at 67 whereby light focused by lens 69 is directed upon the peripheral surface 62. Reflected light is directed upon the photoelectric tube 67. The arrangement is such that the photoelectric tube receives light reflected from a small spot or point upon the peripheral surface 62. As shown particularly in Figure 7, the surface 62 is formed in equal segments which are alternately light and dark. In schematic Figure 7 the light areas are indicated as L1 and L2 and the dark areas as D1 and D2. As shown in Figure 7, the photoelectric tube 67 can be coupled to the input of a vacuum tube 71 connected to operate as a cathode follower, and which in turn is connected to the output 72.

It will be evident that the pulse generating means described above will serve to generate a square wave form, having a frequency directly dependent upon the speed of rotation of the shaft 31. As previously mentioned this frequency is used in conjunction with the speed control system. In addition it can be a part of switching means used in a complete television recording and reproducing system.

The apparatus described above operates as follows: Assuming that the shaft 31 is being driven at a constant speed by the motor 23, the capstan 17 is driven by another motor, and the magnetic tape is fed from left to right as shown in Figure 1, or in other words, at right angles to the plane of rotation of the magnetic units 34. That portion of the tape extending between the guides 14 and 16 is cupped or bent to arcuate form, and that part of the bent tape adjacent the guide member 46 is caused to contact the arcuate surface 47. The pole tips 36 of the magnetic units are caused to successively contact and sweep across the magnetic tape. The rate of feed is such that successive swept areas are displaced longitudinally of the tape. The swept areas are rectilinear, and extend nearly at right angles to the length of the tape. The tape during its movement maintains contact with the members 48, and therefore there is no tendency toward movements in a direction crosswise of the tape. For recording operations the coils 1, 2, 3 and 4 of the magnetic units are connected to the output of a suitable amplifier. For reproducing operations the coils of the magnetic units are connected to the input of an amplifier network. In general it may be stated that the tape moves continuously from one side of the plane of rotation of the head assembly to the other side, and that each transducer unit sweeps across the tape from one tape edge to the other.

It will be evident that apparatus as described above is relatively sensitive to proper synchronism between movements of the tape and rotation of the head assembly during reproduction.

Figure 10:
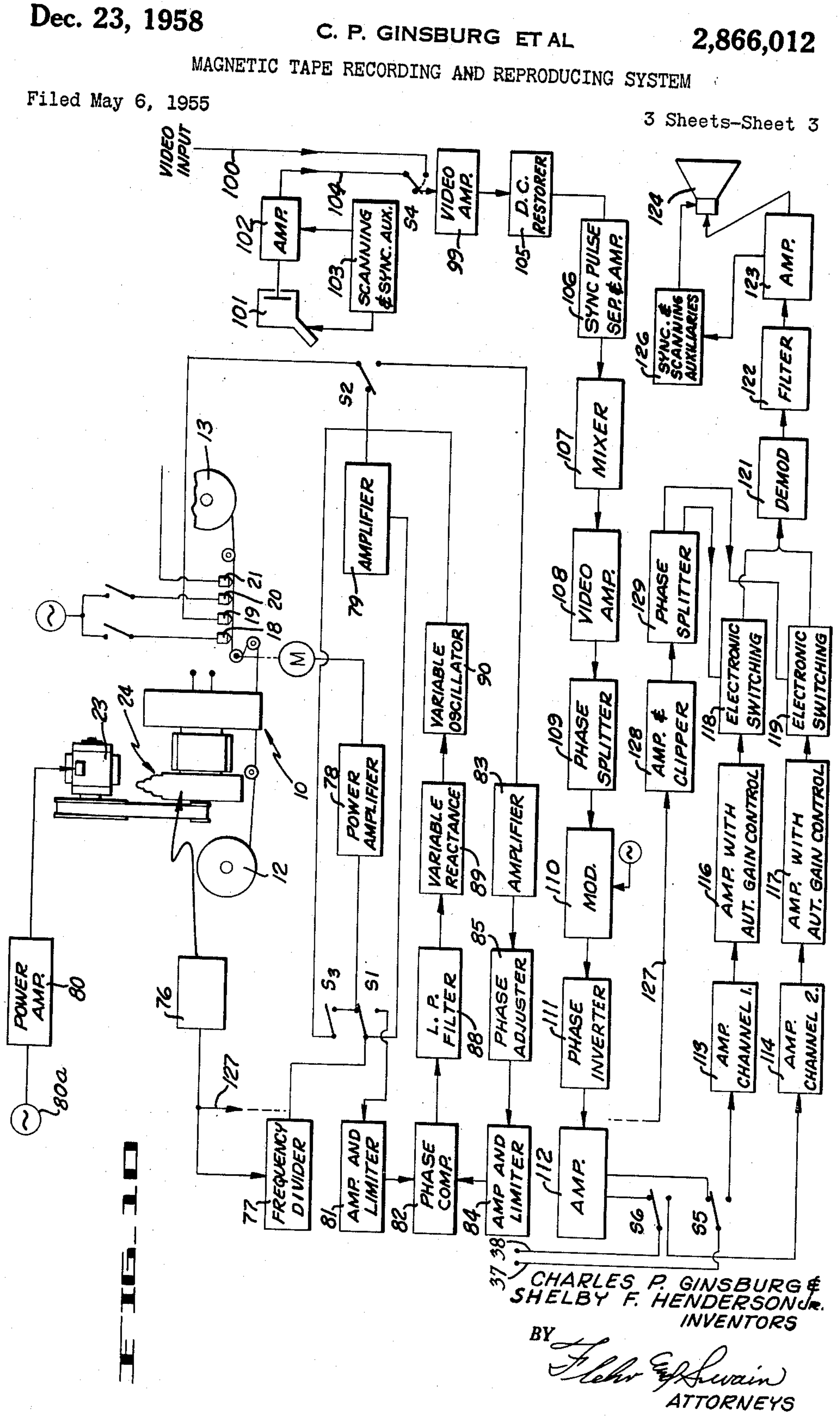
Figure 10 is a schematic diagram illustrating a complete television system utilizing the present invention.

Figure 10 illustrates a complete system for the recording and reproduction of visual images, and which incorporates speed control means. As illustrated in Figure 10 the amplifier 76 represents the cathode follower 71, and is connected to the frequency divider 77. This frequency divider serves to reduce the frequency of the pulses to a frequency convenient for operation of the synchronous alternating current motor M, which is schematically indicated for driving the capstan. Thus, the output of amplifier 76 may normally be 480 C. P. S., and the frequency divider 77 constructed to provide an output frequency of 60 C. P. S. The output of the frequency divider is adapted to be connected by switch S1 to the input of the power amplifier 78. The output of this amplifier supplies the motor M. The output of the frequency divider 77 is also applied to the amplifier 79, which is connected through switch S2 with the recording head 19. The input of power amplifier 80, which supplies the motor 23, is connected with a source 80*a* of alternating current such as a standard reference oscillator operating on a frequency of 60 C. P. S.

The switches S1 and S2 in Figure 10 are positioned for a recording operation. Ignoring the remainder of the system, during recording the motor 23 drives the rotary head at a substantially constant speed determined by the frequency of source 80*a*. The tape is drawn across the rotary head at a speed determined by the speed of rotation of the capstan motor M. The pulse generating means associated with the head generates a square wave at a frequency determined by the rate of rotation of the head, and this frequency is applied to divider 77, to provide a frequency of say 60 C. P. S., which is applied to the amplifier 78 and amplifier 79.

For a reproducing operation, switch S1 is shifted to connect the output of the divider 77 to the amplifier and limiter 81, which in turn connects to the phase comparator 82. Switch S2 is shifted to connect the head 19 to the input of the amplifier 83. The output of this amplifier is applied through phase adjuster 85 to the amplifier and limiter 84, which likewise connects to the phase comparator 82.

The phase comparator 82 is adapted to apply a correcting voltage through the low pass filter 88 to the variable reactance 89, which in turn connects with the variable frequency oscillator 90. The variable reactance 89 can be one making use of a vacuum tube reactance controlled by the control voltage from the phase comparator, and which when varied serves to vary the frequency of operation of the oscillator. A switch S3 can be provided for connecting the output of oscillator 90 to the power amplifier 78.

Figure 11:
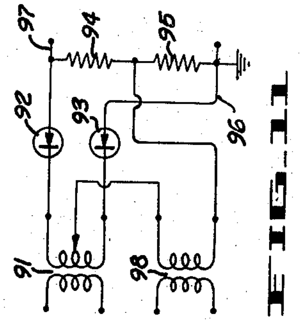
Figure 11 is a circuit diagram illustrating a suitable phase detector for use in the system of Figure 10.

The phase comparator 82 is preferably of the electronic type and can be constructed as shown in Figure 11. A transformer 91 has its secondary terminals connected to the cathodes of the diodes 92 and 93. The diodes have their anodes connected across the load resistors 94 and 95, which in turn connect from the grounded conductor 96 to the output conductor 97. A second transformer 98 has one terminal of its secondary connected to a center tap on the secondary of transformer 91. The other secondary terminal of transformer 98 connects to the point of connection between resistor 94 and 95.

Operation of the phase comparator shown in Figure 11 is as follows: A frequency is applied to the primary of transformer 98 from the amplifier and limiter 81. The reproduced signal from the amplifier and limiter 84 is applied to the primary of transformer 91. The voltage developed across the secondary of transformer 91 either adds to or subtracts from the secondary voltage of transformer 98, depending upon the instantaneous polarity relationships of the two signals. The average current of each of the diodes 92 and 93 depends upon the length of time during each cycle that their applied voltages are additive or subtractive polarity. This in turn is dependent upon the phase angle between the two applied waves. When the phase angle is 90° or 270°, the average currents of the diodes are equal, and the equal voltages of opposite polarity are developed across the load resistors 94 and 95. Hence the net voltage between conductor 97 and ground will be zero. If the phase angle departs from 90° or 270°, the average diode currents will become unbalanced, and the net output voltage between conductors 97 and 96 will no longer be zero. The output voltage polarity will depend upon whether the phase angle is leading or lagging the 90° or 270° relation, and the magnitude will be proportionate to the amount of lead or lag. Assuming that both applied frequencies are of substantially square wave form, a linear relation between output voltage and phase angle is obtained over a range of 90°. Since the current flow through the diodes is in the form of pulses, it is desirable to provide the low pass filter 88 in the phase comparator output so that only a direct current voltage proportional to the average current is applied to the variable reactance 89.

Operation of the speed control system is as follows: The apparatus is first operated in the manner previously described for a recording operation, with the switches S1, S2 and S3 positioned as illustrated. A submultiple of the frequency generated by the photoelectric means (i. e. from the divider 77) is continuously recorded by head 19 on one margin of the tape and is applied to the amplifier 78 to provide alternating current for energizing the capstan motor M. During such recording operations there may be some slight deviations in the speed of operation of the rotary head, due, for example, to slight slippage of the driving belt or variations in the mechanical load on the head. During recording head 18 can be connected to a source of alternating current through a switch as illustrated, thereby serving to erase the margin of the tape on which head 19 is operating.

For reproduction the tape is run through the machine a second time and the positioning of the switches S1, S2 and S3 is shifted, whereby the frequency divider 77 now has its output connected to the amplifier and limiter 81 and the phase comparator 82, and the head 19 connected through switch S2 to the amplifier 83. The variable oscillator 90 applies a frequency to the amplifier 78 of, for example, 60 C. P. S., whereby motor M is energized by current of this frequency. Assuming that some lack of synchronism tends to occur, a difference in phase relationship is developed between the frequencies applied by amplifiers 81 and 84, with the result that a correcting voltage is developed at the output of the phase comparator, and the correcting voltage is applied to the variable reactance 89 through the low pass filter 88. Thus a change in voltage is applied to effect a corresponding correcting change in the frequency of the operation of the oscillator 90, and this results in a correcting change in the frequency of excitation of the motor M.

The electronic network used for recording a broad band of signal frequencies consists of a video amplifier 99 to which video signals can be applied by way of the indicated input 100. As a possible source of video signals, there is schematically illustrated an iconoscope tube 101 which is connected to the amplifier 102. The tube and amplifier are provided with the customary scanning and synchronizing auxiliaries 103. The output 104, which has a wave form corresponding to the visual image being transmitted, is applied to the input of amplifier 99 through switch S4. The output of video amplifier 99 is applied to the D. C. restorer 105, which connects with the synchronizing pulse separator and amplifier 106. The latter serves to separate the synchronizing pulses from the video wave form, and to separately amplify such pulses for application to the mixer 107.

With respect to the synchronizing pulse separator and amplifier 106, it may be explained that it is desirable (but not essential) to intensify the synchronizing pulses to provide a subsequent composite wave form which has extended portions representing the synchronizing pulses. With standard American television practice, the height of that portion of the wave form representing synchronizing pulses can be about 25% of the total height of the wave form as measured from the base line representing maximum white level. Assuming that the wave form is so proportioned as it leaves the D. C. restorer 105, the upper extensions representing the synchronizing pulses can be extended by separate amplification to be 50% or more of the total wave form height from the maximum white level. The amplifier 108 serves to amplify the composite wave form, and supply the signal to the phase splitter 109, which has its output applied to the modulator 110.

As indicated carrier frequency is applied to the modulator 110, and preferably the carrier source is clipped to facilitate linear modulation. A modulated (i. e. A. M.) carrier signal from the modulator 110 is applied to the phase inverter 111, to provide a suitable signal for application to the push pull amplifier 112. The two output leads from the amplifier 112 are connected to the leads 37 and 38 of the rotary head by the switches S5 and S6.

By changing the position of switches S5 and S6, the leads 37 and 38 from the rotary head can be connected to the reproducing electronic network. As shown in Figure 10, leads extend from the switches S5 and S6 to the first and second amplifier channels 113 and 114. Amplifiers 113 and 114 connect with the automatic gain control amplifiers 116 and 117, which have their outputs connected to the electronic switching or gating means 118 and 119. The outputs of the switching means 118 and 119 are combined and applied to the demodulator 121.

The output from the demodulator is shown being passed through filter 122, and then amplified at 123 for application to the television tube 124. In accordance with standard American television practice the amplifier 123 and tube 124 are shown associated with the synchronizing and scanning auxiliaries 126, which include the horizontal and vertical sweep generators, and means for utilizing the synchronizing pulses to maintain proper synchronization. Pulses utilized by the electronic switching means 118 and 119 are obtained from the pulse generating means 24. Thus lead 127 is connected to the amplifier and clipper 128, the output of which is applied to the phase splitter 129 to provide successive timed pulses for application to the electronic switching devices 118 and 119.

Operation of a complete system as described above can be summarized as follows: The magnetic tape is driven at a controlled speed by the motor M in the same manner as previously described, and the rotary magnetic head assembly is likewise driven at a constant speed by the motor 23. Assuming that a record is being made, all of the switches are in the positions shown in solid lines, and the frequency supplied to the driving motor 23 is derived from the standard source 80*a* connected to amplifier 80. Assuming that the rotary head contains four recording and reproducing units, which are spaced 90° apart, then as the head rotates in conjunction with linear motion of the tape, the units sweep successively across one side of the tape, each sweep providing a rectilinear recording track parallel to the preceding track, and spaced therefrom. The width of the tape with respect to the sweep of the magnetic units is such that along both the margins of the tape duplicate recording takes place. In other words, as each magnetic unit approaches a margin of the tape it arrives at a point where the subsequent recording to complete the track is duplicated by the next succeeding magnetic unit as it passes over the other tape margin. In accordance with techniques well known to those familiar with television equipment, the tube 101 provides an input for the video amplifier 102, which has a wave form corresponding to the image being scanned. In modulator 110 a fixed carrier frequency suitable for recording, as for example a frequency of the order of 3.0 to 4.0 megacycles, is amplitude modulated by the video wave form to provide an amplitude modulated output. The modulation envelope with this output corresponds to the wave form applied to the amplifier 112, except that it contains a mirror image of the picture information and (assuming that means 106 is employed) the synchronizing pulses have been intensified. The output of the amplifier 112 is applied to the leads 37 and 38, and therefore applied to the magnetic units of the rotary head. This composite signal is therefore recorded electro-magnetically upon the tape, the record track being in the form of successive rectilinear track areas as previously described. Because of the relatively high speed of movement which can be employed between each magnetic unit and the tape, a wide frequency spectrum can be effectively recorded, as for example spectrums ranging from zero C. P. S. to 4 megacycles, depending upon the carrier frequency employed and the speed of rotation of the head.

Assuming that a record has been made in the manner described above, the tape is rewound and the various switches S1–S6 placed in playback positions. The motor M is now driven by frequency reproduced by the rotary magnetic head. Synchronization is automatically maintained to a high degree of precision betwen the rotation of the head assembly and the driving of the tape, by virtue of the speed control system previously described. The magnetic units of the rotary head assembly are caused to track upon the previous recording whereby electrical current variations are induced in the windings of the magnetic units to provide signal variations on the leads 37 and 38. Signal variations are amplified in the channels 113 and 114 and applied to the inputs of the amplifiers 116 and 117. Signals from 116 and 117 are applied to the electronic switching devices or gates 118 and 119, which are operated alternately by pulses from the pulse generating means 24. Switching is such as to pass all of the signals representing the visual image to the demodulator 121. Portions of the tape upon which recording has been duplicated, and which remain after marginal erase and record operations for recording control and audio frequencies, are eliminated. The demodulated signal from 121 can be used in any desired way to reproduce the visual image. The filter 122 is preferably adjusted to reject a spurious frequency introduced by virtue of full wave detection of the carrier, thus avoiding any disturbance to the reproduced visual image. The tube 124 in conjunction with amplifier 123 and the auxiliaries 126, reproduce the image in the same manner as a standard television receiver.

The electronic network described above for recording and reproducing visual images is likewise disclosed and claimed in siad copending application Serial No. 427,138. However, in the present instance, this system makes use of the pulsing means 24, both in connection with the speed control system, and for operating the switching means.

Figure 9:
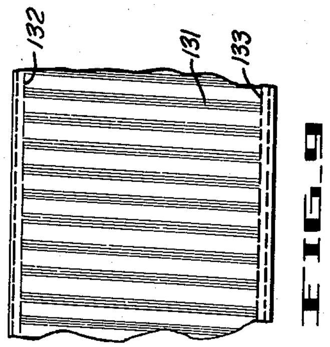
Figure 9 is a detail in plan schematically showing a portion of magnetic tape with record track areas thereon.

Figure 9 illustrates a portion of the magnetic tape 11 with record areas upon the same. The areas 131 (exaggerated as to width and spacing) represent the rectilinear track areas which are swept by the magnetic head units, and these areas are slightly spaced apart in the direction of the length of the tape, and are disposed at an angle slightly less than 90° with respect to the length of the tape. By way of example, where the magnetic tape is 2" in width, each track area may have a width as measured lengthwise of the tape of 10 mils. The dotted lines 132 and 133 represent the demarcation between the tracks which carry the picture intelligence, and the marginal edge portions over which erase heads have operated. As previously mentioned head 18 operates as an erase head immediately in advance of the head 19, during recording. On the other margin of the tape, head 20 can be connected to a source of alternating current to function as an erase head, in advance of the head 21. Head 21 can be used for the recording of sound signals. Switching operations occur shortly before the heads reach the lines 133. In Figure 9 it is assumed that the lower marginal edge is being used for the recording of audio frequencies, and the upper margin for recording the control frequency. In both instances the erase operations performed by heads 18 and 20 eliminate most but not all of the track portions carrying duplicated picture information.

We claim:

1. In magnetic tape apparatus, at least one transducer unit, means serving to carry said unit for rotation, motor means for rotating the unit, tape transport means adapted continuously to move a magnetic tape from one side to the other of the plane of rotation of the unit, guide means for bending that portion of the tape adjacent the path of movement of the unit to an arcuate contour and for positioning said portion of the tape whereby said unit is caused to sweep over the tape from one tape edge to the other, and means forming an abutment shoulder engaging one edge of the tape in the region adjacent the plane of rotation of said unit.

2. In magnetic tape apparatus, at least one magnetic transducer unit, means serving to carry said unit for rotation, motor means for continuously rotating said unit, tape transport means adapted continuously to move a magnetic tape transverse to the plane of rotation of the unit, guide means for engaging that portion of the tape passing in proximity with the plane of rotation of the unit, said guide means having two arcuately contoured surfaces, said surfaces being spaced axially and conforming to a cylinder having its axis substantially coincident with the axis of the rotation of the unit, the spacing between said surfaces being aligned with the plane of rotation of the unit and being spanned by the tape for engagement therewith, said surfaces having recesses interrupting the same, and means serving to connect said recesses to a source of pneumatic suction.

3. Apparatus as in claim 2 in which said surfaces are concave.

4. In a magnetic tape apparatus, a transducer unit, means serving to carry the unit for rotation, motor means for continuously rotating said unit, tape transport means adapted continuously to move a magnetic tape transverse to the plane of rotation of the transducer unit, guide means for arcuately bending that portion of the tape adjacent the head whereby said unit sweeps laterally across the tape, means forming an abutment shoulder engaging one edge of the tape in a region adjacent the sweep path of said unit, said one edge of the tape continuously engaging and sliding freely over said shoulder to thereby prevent movement of the tape in a direction corresponding to the direction of rotation of the unit, and pneumatic suction means for retaining the tape in contact with said guide means.

References Cited in the file of this patent

UNITED STATES PATENTS

| | | |
|---|---|---|
| 2,245,286 | Marzocchi | June 10, 1941 |
| 2,352,023 | Schuller | June 20, 1944 |
| 2,648,589 | Hickman | Aug. 11, 1953 |